United States Patent
Mouk et al.

Patent Number: 5,613,238
Date of Patent: Mar. 18, 1997

[54] METHODS OF DECONTAMINATING SOILS CONTAINING HAZARDOUS METALS

[75] Inventors: Robert W. Mouk, Westerville; Alan F. Heyduk, Columbus; Albert E. Abel, Powell, all of Ohio

[73] Assignee: Commodore Applied Technologies, Inc., New York, N.Y.

[21] Appl. No.: 507,126

[22] Filed: Aug. 23, 1995

Related U.S. Application Data

[63] Continuation-in-part of Ser. No. 304,791, Sep. 12, 1994, Pat. No. 5,495,062.

[51] Int. Cl.$^6$ .......................................................... G21F 9/00
[52] U.S. Cl. ........................... 588/1; 134/2; 134/16; 134/25.1; 134/26; 134/42; 209/5; 209/18; 976/DIG. 376
[58] Field of Search ............................. 588/1; 134/2, 10, 134/25.1, 26, 42; 209/5, 18; 976/DIG. 376

[56] References Cited

U.S. PATENT DOCUMENTS

| | | | |
|---|---|---|---|
| 4,841,998 | 6/1989 | Bruya | 134/10 |
| 4,853,040 | 8/1989 | Mazur et al. | 134/2 |
| 4,906,302 | 3/1990 | Bruya | 134/10 |
| 4,969,775 | 11/1990 | Cappel et al. | 405/128 |
| 5,055,196 | 10/1991 | Darian et al. | 210/638 |
| 5,110,364 | 5/1992 | Mazur et al. | 134/2 |
| 5,162,600 | 11/1992 | Cody et al. | 588/236 |
| 5,495,062 | 2/1996 | Abel | 588/1 |
| 5,516,968 | 5/1996 | Abel | 588/1 |

FOREIGN PATENT DOCUMENTS

593352A1  4/1994  European Pat. Off. .

*Primary Examiner*—Ngoclan Mai
*Attorney, Agent, or Firm*—Howard M. Ellis

[57] ABSTRACT

Soil including sand and clays contaminated with nuclear waste materials and/or ions of hazardous non-radioactive metals or metalloids are decontaminated by treating with anhydrous liquid ammonia alone or in combination with solvated electrons. Methods include removing ions of hazardous metals or metalloids by mixing with ammoniacal solutions to provide an ammoniacal liquid-containing product with coordination complexes. Methods also comprise concentrating contaminants, such as plutonium, uranium and thorium, for example, in the fines of soil and clay to yield residual soil products which are sufficiently free of contaminants to allow reclamation. Economics are improved over aqueous systems since ammonia can be recovered and recycled. By concentrating nuclear and nonnuclear wastes in soil fines space requirements ordinarily needed for storage of untreated soil and handling costs can be significantly reduced.

43 Claims, 2 Drawing Sheets

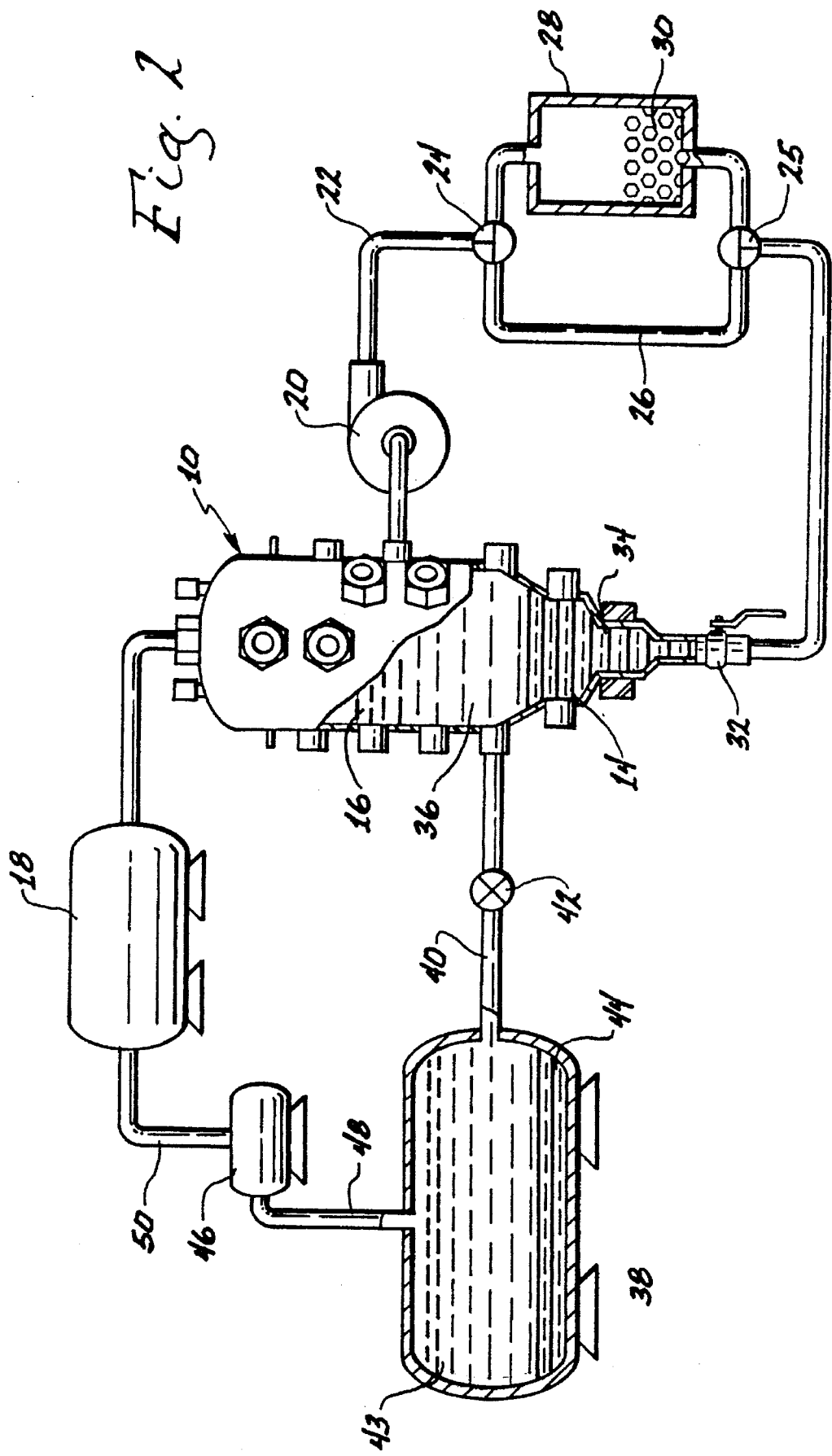

1

METHODS OF DECONTAMINATING SOILS CONTAINING HAZARDOUS METALS

CROSS REFERENCE TO RELATED APPLICATION

This application is a continuation-in-part of Ser. No. 08/304,791, filed Sep. 12, 1994 now U.S. Pat. No. 5,495,068.

TECHNICAL FIELD

The present invention relates to methods of decontaminating soil, and more specifically, to the decontamination of nuclear waste-containing soils, soils contaminated with ions of hazardous nonradioactive metals or metalloids and soils contaminated with mixed wastes by methods which also permit the reclamation of residual soil products.

BACKGROUND OF THE INVENTION

As a result of military testing programs involving the detonation of nuclear devices, both in the United States and abroad, the environment, and particularly vast areas of soil in testing zones have become contaminated with nuclear waste materials. In some instances, for example, detonation of a nuclear device failed to achieve the needed critical mass of the radioactive components, resulting in substantial quantities of enriched uranium and plutonium being scattered over wide areas of desert testing grounds. In addition to nuclear testing programs, contamination of soil with radioactive materials has occurred at nuclear weapon manufacturing sites, such as at Hanford, Wash.; Rocky Flats, Colo.; Savannah River, Ga.; Oak Ridge, Tenn., and elsewhere through spills or releases into the environment.

Efforts to successfully decontaminate these sites have proven difficult and extremely costly due to massive amounts of soil requiring treatment and/or storage. Cleanup has usually meant a slow and costly process where the contaminated soil is excavated and transferred to a different location for storage. Abandoned salt mines and mountain repositories have been proposed as storage facilities for nuclear wastes, but too often rejected later on for technical and/or political reasons. Because of a finite amount of space available for storage of nuclear waste materials progress in the reclamation of contaminated sites has been slow.

In an effort to mitigate the nuclear waste storage crisis systems for reducing bulk quantities of contaminated soil requiring storage have been proposed wherein the radioactive components are concentrated in a soil fraction. One system, for example, employs an aqueous washing process requiring the use of soil scrubbing chemicals, multiple separation steps, water treatment, and so on. Although quite effective in concentrating radioactive components in silt and clay fractions of soil, capital and operating costs per ton of soil treated are viewed as economically unattractive. Consequently, most methods proposed for concentrating nuclear waste have not received wide acceptance.

Like nuclear wastes, environmental contamination by metal ions, especially when present in soil or groundwater, poses serious threats to human, animal and plant life. Metals such as lead, chromium, cadmium and arsenic have been released into the environment in quantities which make large-scale remediation projects necessary in order to protect the health of the general public. Such metals represent some of the more difficult environmental contaminants to treat because they form salts or oxides, which in turn dissociate into ionized species facilitating their introduction into the food and biological chain.

Accordingly, there is need for an innovative, cost-effective process for decontaminating soils containing nuclear waste materials, such as those generated at sites of nuclear weapon plants, nuclear testing sites, and wherever treatment calls for managing substantial volumes of soil contaminated with radioactive materials. The process should enable reduction of the space otherwise required for storage of untreated soils by concentrating in a small fraction of the soil while also permitting reclamation of these sites. Likewise, a cost effective process is needed for decontaminating soils containing ions of hazardous nonradioactive metals and metalloids, such as mercury, arsenic, selenium, chromium, lead, etc., and mixed wastes-containing such hazardous ions together with nuclear wastes like radionuclides of the actinide series, and/or organic compounds like PCBs.

SUMMARY OF THE INVENTION

It is therefore a principal object of the invention to provide improved, more economic methods for separating radioactive and non-radioactive components from contaminated soil wherein the treated soil is made sufficiently free of the potentially toxic components, i.e., metals and metalloids as to permit reclamation of the soil. The expression "sufficiently free" is intended to mean soil treated according to the present invention so it (I) is practically devoid of all unwanted radioisotopes (radionuclides), or (ii) contains residual amounts of low-level radioisotopes allowing treated soil to be reclaimed as is, or (iii) contains amounts of low-level radioisotopes which can be diluted sufficiently with an inert material to reduce its activity to an acceptable level.

Expressions, such as "nuclear waste" and "radioactive waste" as recited in the specification and claims are intended to refer to soils contaminated with isotopic forms of elements having unstable nuclei which disintegrate and emit energy most commonly as alpha particles, beta particles and gamma rays. They include mainly products or by-products of nuclear fission or unreacted products of a nuclear device. Representative examples include such radionuclides as $Cs^{137}$; $Co^{60}$; $K^{40}$; $Pu^{236}$; $U^{235}$; $U^{238}$; $Ru^{103}$; Te; $Sr^{90}$; Rb; Y; Re; Rh; Pd; Tc; Np and Am.

Methods of the invention provide for the recovery of nuclear waste materials in soil fractions, particularly in small, high surface area particles, such as soil fines and silt fractions of clay for subsequent storage or further treatment. By concentrating nuclear waste materials in soil fines and clay silt, for example, storage space requirements per ton of soil treated are significantly reduced, perhaps by as much as 90 percent over storage space requirements otherwise required for untreated soils.

Methods of the invention comprise the steps of:

(a) mixing a liquid ammonia or ammoniacal liquid with a soil contaminated with nuclear waste in a closed vessel to form an ammonia-nuclear waste containing soil dispersion or slurry;

(b) allowing soil particles to selectively precipitate from the slurry or dispersion of step (a) to form a lower solid phase of soil particulates while forming an upper liquid-solid phase comprising soil fines dispersed in the liquid ammonia;

(c) separating the upper liquid-solid phase from the lower solid phase of soil particulates, the fines of the upper liquid-solid phase having the majority of the radionuclide contaminant(s), or in other words, the lower solid phase is sufficiently free of the nuclear waste materials for reclamation of the soil particulates, and (d) separating the ammoniacal liquid from the soil fines containing the nuclear waste material for disposal or further treatment of the fines.

The term "disposal" is intended to include storage of the nuclear waste-containing soil fines. The expression "further treatment" is intended to include any procedure which will modify the potentially toxic properties of the radionuclide material to substances of reduced toxicity and impact on the environment, or to materials which can be recovered as useful by-products. It will be understood, methods of storage and further treatment of the concentrated nuclear waste material do not constitute part of this invention. Such methods are known by persons skilled in the art.

Mazur et al in U.S. Pat. No. 5,110,364 disclose ammonia as a pretreatment in desorbing organic compounds, and particularly halogenated organic compounds like PCBs from soil, followed by chemical destruction of the compound by dehalogenation through a chemical reduction mechanism with solvated electrons. Mazur et al, however, fail to teach or suggest utilizing ammonia as a means of separating soil into fractions wherein the larger, lower surface area particulates are allowed to separate out from the less dense liquid ammonia-solid phase containing the smaller, higher surface area soil fines. In contradistinction, the methods of Mazur et al provide for treating "whole" soil in the reduction of the halogenated carbon compound contaminants without isolating soil particles or soil fractions from ammonia/soil slurries by allowing phase separation to occur and performing various separation steps.

Serendipitously, it was found that radionuclides appear to have a preferential affinity for the smaller, higher surface area fines and silts of soils, clays and sand. Hence, by isolating the fines and silt particulates, especially the smaller particles having higher surface areas relative to the particles precipitating out of ammonia-soil dispersions one, in effect, is selectively concentrating the nuclear waste material in the smallest volume of natural solid carrier material to effectively lessen the tonnage volume of material requiring storage or further treatment. Accordingly, it is a primary objective of the invention to provide an improved more economic method for concentrating a substantial portion of the nuclear waste material in a reduced soil fraction for more efficient management of soil cleanup projects involving large volumes of soil, so as to permit reclamation of major volumes of previously contaminated soil.

It is still a further object of the invention to optionally include the step of recovering and recycling for reuse in the foregoing process ammonia from step (d), the recovery and recycling being performed by methods already known in the art.

For purposes of this invention, the expressions "liquid ammonia" and "ammoniacal liquid" as used herein are generally intended to include nitrogen-containing solvents, such as liquid ammonia. This would include anhydrous liquid ammonia and solutions of ammonia comprising small amounts of water. However, when used in dissolving metal reactions in forming solvated electrons, as will be discussed in greater detail below, the ammoniacal liquid is preferably non-aqueous. In addition to liquid ammonia, other nitrogen-containing solvents and co-solvents can be employed which are inert in the presence primary amines, secondary amines, tertiary amines, and of solvated electrons. Representative classes include mixtures of such amines. Examples of such amines include alkyl amines, like methyl amine, ethyl amine, dimethyl amine, triethyl amine, n-propyl amine, isopropyl amine, PYRROLIDINE and other nitrogen-containing solvents and co-solvents which are suitably inert in the presence of electrons.

It is still a further object to provide an additional embodiment of the invention for decontaminating soil containing nuclear waste by the steps of:

(a) mixing a liquid ammonia or ammoniacal liquid with soil contaminated with nuclear waste in a closed vessel to form an ammonia-nuclear waste-containing soil dispersion or slurry;

(b) treating the dispersion or slurry of step (a) with solvated electrons by contacting with a reactive metal;

(c) allowing soil particles to selectively precipitate from the dispersion or slurry of step (b) to form a lower phase of soil particulates while forming an upper liquid-solid phase comprising soil fines suspended in the liquid ammonia;

(d) separating the upper liquid-solid phase from the lower phase of soil particulates, the lower phase of soil particulates being sufficiently free of nuclear waste, and (e) separating the ammonia from the soil fines for disposal or further treatment of the fines.

While it has been observed that ammonia has a unique ability to form very fine slurries when mixed with soils, it was observed that dispersions of soil appear to be further altered by some mechanism not fully understood, when in the presence of solvated electrons formed in dissolving metal reactions with ammonia. That is, by contacting the ammoniated soil dispersion with either an alkali or alkaline earth metal, solvated electrons are formed in the mixture, in-situ. The solvated electrons appear in some instances to optimize separation of smaller soil fines. In some instances where particle size cross-section is larger than desired, electrons solvated in liquid ammonia appear to provide more optimal demarcation and separation of the smaller fines containing nuclear waste materials from other particles of the slurry.

As in the first embodiment of the invention, the foregoing second embodiment of the invention contemplates the step of recovering and recycling the ammonia from step (e) for reuse. Similarly, the precipitated residual solid soil particles of step (d) are "sufficiently free" of radioisotopes to permit reclamation of large bulk volumes of soil.

In accordance with the invention, it was also discovered the foregoing process with ammoniacal solutions, etc., is also useful in decontaminating soils containing hazardous, but nonradioactive metals by the steps of:

(a) mixing in a closed vessel an ammoniacal liquid with a soil contaminated with at least one ion of a hazardous metal or metalloid to form a dispersion or slurry;

(b) separating an ammoniacal liquid-containing product from the dispersion or slurry of step (a) to yield a soil residue sufficiently free of ions of said hazardous metal or metalloid to permit reclamation, and (c) separating the ammoniacal liquid from the ammoniacal liquid-containing product of step (b) to yield a hazardous metal or metalloid-containing residue for disposal or further treatment.

While not wishing to be held to any specific mechanism of action involved in separating ions of hazardous metals and metalloids from soils it has been observed the target material is frequently soluble in the ammoniacal liquid. In this regard, co-ordination compounds may form in the soil washing process with ammonia, and possibly form metal-ammonia ligand complexes. Representative metals of such coordination compounds and complexes may include those from the group of arsenic, antimony, selenium, cadmium, cobalt, mercury, chromium, lead and mixtures thereof.

Co-ordination compounds can also be prepared by introducing other ligand complexing agents into the ammonia-soil slurry-containing hazardous metals. Such metals can be removed by forming, for example, ammonia soluble metal cyanide ligand complexes by adding a source of cyanide ions, e.g., sodium cyanide, ammonia cyanide, etc., to the slurry. Removal of the ammoniacal liquid results in the elimination of the hazardous metal from the soil fraction.

As a further embodiment of the invention soils containing hazardous nonradioactive metals may be decontaminated by the steps of:

(a) mixing in a closed vessel an ammoniacal liquid with a soil contaminated with at least one ion of a hazardous metal or metalloid to form a dispersion or slurry;

(b) allowing soil particles to selectively precipitate from the dispersion or slurry of step (a) to provide a lower phase comprising a precipitate of soil particulates while forming an upper liquid-solid phase comprising soil fines dispersed in said ammoniacal liquid;

(c) separating the upper liquid-solid phase from the lower phase, the precipitate of soil particulates of the lower phase being sufficiently free of ions of the hazardous metal or metalloid to permit reclamation of said soil particulates, and (d) separating the ammoniacal liquid of the upper liquid-solid phase to yield a residue comprising the hazardous metal or metalloid for disposal or further treatment.

It is yet a further aspect of the invention to provide a method of treating soils contaminated with mixed wastes, wherein the waste may be comprised of an ion of a hazardous non-radioactive metal or metalloid and a nuclear waste, for example. Typically, the nuclear waste is comprised of a radionuclide or radioactive isotopic metal. They are generally intended to include metals of the actinide series, such as uranium, plutonium, thorium and mixtures of the same.

As a further embodiment of the invention, soil contaminated with hazardous nonradioactive metals may be decontaminated with ammoniacal liquids and solvated electrons by the steps of:

(a) mixing in a closed vessel an ammoniacal liquid with a soil contaminated with at least one ion of a hazardous metal or metalloid to form a dispersion or slurry;

(b) treating the dispersion or slurry of step (a) with solvated electrons by contacting with a reactive metal selected from the group consisting of an alkali metal, alkaline earth metal and aluminum;

(c) separating an ammoniacal liquid-containing product from the dispersion or slurry of step (b) to yield a soil residue sufficiently free of ions of the hazardous metal or metalloid to permit reclamation of the soil, and (d) separating the ammoniacal liquid from the ammoniacal liquid-containing product of step (c) to yield a hazardous metal or metalloid-containing residue for disposal or further treatment.

The method of step (b) may be performed by circulating at least portion of the ammoniacal liquid through a by-pass containing the reactive metal. The solution of solvated electrons is recirculated back to the closed vessel for treating the contaminated soil.

This aspect of the invention also contemplates treatment of soils contaminated with mixed wastes, i.e., an ion of a hazardous nonradioactive metal or metalloid and a nuclear waste, for example. Typically, the nuclear waste comprises a radionuclide or a radioactive isotopic metal of the actinide series, such as uranium, plutonium, thorium and mixtures of the same.

The invention is also intended to include mixed wastes comprising an ion of a hazardous non-radioactive metal or metalloid and an organic compound, and more particularly, a halogenated organic compound, such as PCBs, dioxins and pesticides.

BRIEF DESCRIPTION OF THE DRAWINGS

For a further understanding of the invention and its characterizing features reference should now be made to the accompanying drawings wherein:

FIG. 2 is a diagrammatic view of a system for separating radionuclides in contaminated soil and concentrating in a reduced soil fraction using solvated electrons as an option.

DESCRIPTION OF THE PREFERRED EMBODIMENTS

Figure 1:
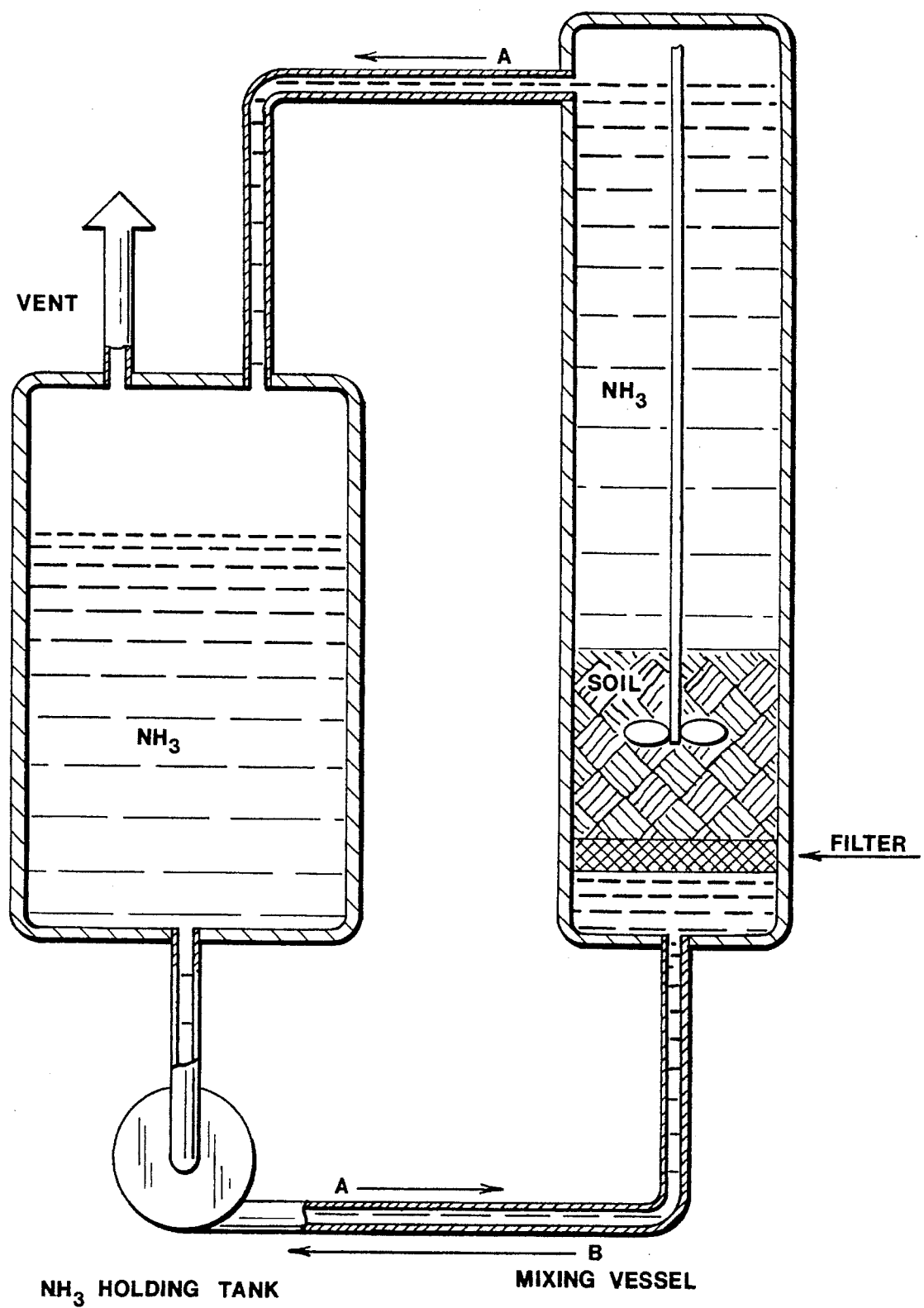
FIG. 1 is a diagrammatic view of a system for decontaminating soil containing hazardous metals by filtration.

The invention relates to improved methods for separating from soil unwanted nuclear waste material and hazardous metals, particularly radionuclides and ionized forms of potentially toxic nonradioactive metals and metalloids, such as arsenic, antimony and selenium, by concentrating in some instances in very small particles or fines of soil or clay. The concentrated radionuclide and nonradioactive metallic ion-containing fines, for example, are thus in a state which permits more efficient disposal, such as by storage, or for further treatment to modify the hazardous substances to less toxic and more environmentally benign substances.

The methods are based on the observation that liquid ammonia possesses the unique ability to break up soils into very fine particles. It was also found that suspensions of what appear to be extremely fine particles of these can be prepared by mixing with ammonia. Radio-nuclide-contaminated soils and soils contaminated with ions of hazardous nonradioactive metals and metalloids, or soils contaminated with both are mixed, preferably with anhydrous liquid ammonia, to form finely-dispersed suspensions or slurries. Because of the lower density of ammonia relative to water, significantly smaller soil particles remain suspended in the liquid, and particles which would otherwise be suspended in water readily precipitate from the dispersion because of the lower density and viscosity of ammonia. The greater bulk fraction of the soil consisting of larger precipitated particles are sufficiently free of the radionuclide or ions of the hazardous nonradioactive metal or metalloid contaminants as to permit reclaiming large volumes of the treated soil.

It was observed, for instance, that washing soils in ammoniacal solutions, and particularly anhydrous liquid ammonia results in significant reduction in concentrations of certain metal ions even when no particulates are visible in the ammonia following treatment. Accordingly, liquid ammonia was found to be effective in both physically and chemically enhancing decontamination in breaking down even tightly bound clays into fine slurries of platelets coupled with a metal transporting mechanism for maximizing extraction and exposure of metal contaminants, while also performing as a ligand in binding the contaminating metals in complexing or chelating type reactions.

The ammoniacal liquid is preferably anhydrous liquid ammonia, but solutions of at least 50 percent-by-weight of ammonia in water can also be employed when using ammonia exclusively.

Soils contaminated with ions of hazardous nonradioactive metals and metalloids, such as arsenic and chromium (VI), or soils contaminated with mixed wastes, such as radioactive isotopic metals, like uranium, plutonium and thorium along with hazardous nonradioactive metal ions can also be effectively treated by forming dispersions or slurries with anhydrous liquid ammonia, which in-turn can be treated with solvated electrons by contacting the ammonia-soil slurry with a reactive metal, particularly a more electropositive metal, like sodium, potassium, barium and calcium. When a metal like sodium dissolves in the liquid ammonia, it becomes a cation by losing its valence electron as illustrated in the following equation:

$$Na \rightleftharpoons Na^+ + e^-$$

The ammonia molecules then solvate these ions and electrons reversibly according to the equations:

$$Na^+ + xNH_3 \rightleftharpoons Na(NH_3)_x^+$$

$$e^- + yNH_3 \rightleftharpoons e^-(NH_3)_y$$

The "ammoniated electron" is responsible for the strong reducing properties exhibited by such solutions. In this regard, the methods of the invention are suited for treating soils contaminated with hazardous chromium (VI) wherein the solvated electrons reduce the ions from the hazardous higher oxidation state to the less hazardous chromium (III).

The methods as described herein are especially well suited for the selective removal of lead from soils, particularly when treated with solvated electrons.

Solvated electrons are also useful in decontaminating soils having mixed waste, like ions of a hazardous nonradioactive metal or metalloids along with polyhalogenated organic compounds, such as polychlorinated biphenyls (PCBs), as well as dioxins, e.g., 2, 3, 7, 8-tetrachlorodibenzo-p-dioxin, and any of the several other members of the family of chlorinated dioxins, and various pesticides. The term "pesticide" is intended to denote any substance, organic or inorganic, used to destroy or inhibit the action of plant or animal pests. Thus, pesticides would include insecticides, herbicides, rodenticides, miticides, etc. Accordingly, this aspect of the invention is particularly effective in treating soils contaminated with mixed wastes by separating and complexing hazardous metal ions through the action of the ammonia, forming dispersions while simultaneously reducing halogenated compounds to compounds of lesser toxicity and impact on the environment. Methods for the destruction of halogenated organic compounds are disclosed in U.S. Pat. No. 5,110,364.

A general method of decontaminating soils containing ions of hazardous nonradioactive metals or metalloids with ammoniacal solutions according to the present invention is illustrated by FIG. 1. Soil can be first added to the mixing vessel of FIG. 1. Anhydrous liquid ammonia is circulated from the ammonia holding tank and used to fluidize the soil resulting in the formation of a fine slurry of soil suspended in the ammonia. Agitation of the suspension can be provided by circulating the ammonia (A) between the mixing vessel and ammonia holding tank by pump means, although other mixing methods may be used. After the slurry has been sufficiently mixed the liquid phase ammonia can be separated from the soil by decanting, pressure filtration (B), or by other known methods. The ammonia in the holding tank contains metal ions which are recovered by evaporating the ammonia through the vent, where it is captured for reuse by conventional ammonia collection methods.

Methods of the invention may also be performed on soils which are predominantly sand, and which are practically free of clay and organic constituents. In this embodiment, clays possessing ion exchange properties, such as atapulgite, montmorillonite, kaolinite are added to the ammoniacal reaction mixture wherein the hazardous ions are adsorbed by the clay, and the clay-metal dispersion decanted from the sand.

As a further embodiment, the ammoniacal solutions can also employ known complexing/chelating agents, such as EDTA, NTA (nitrilotriacetic acid), 8-hydroxyquinoline, cyanide ions, and so on, which enhance solubility of the metal ions in the solvent for removing hazardous metals from the soil slurries.

The following specific examples demonstrate the invention, however, it is to be understood they are for illustrative purposes only and do not purport to be wholly definitive as to conditions and scope.

EXAMPLE I

Methods of the invention can be carried out by means of a system, such as that illustrated by FIG. 2. A closed reactor 10 is utilized as a mixing vessel for nuclear waste contaminated soil 14 positioned at the bottom of the vessel. The term "soil" is intended to have its ordinary understood meaning, and includes one or more components in varying proportions, such as of clay, stone, disintegrated rock particles or sand, organic matter, along with varying amounts of water and the like. Obviously, soil compositions will vary widely depending on source and location. For instance, soils from desert or other arid locations are mainly sandy compositions with little organic material or clay components. One representative soil from the State of Ohio known as Ohio Loam was found to have an analysis of 35% sand, 32% silt, 33% clay and 4.1% organic matter and have a pH 7.7. By contrast soil from Oak Ridge, Tenn. was found to contain only 1% sand, 26% silt, 73% clay, no organic matter, and have a pH of 5.2. In sum, the term "soil" for purposes of this invention is intended to have a broad compositional makeup, including varying ranges of clay, disintegrated rock/sand particulates, organic matter, silt-fines, moisture and so on. This would include soils which are mainly clay or sand.

Anhydrous liquid ammonia 16 or a solution of liquid ammonia containing up to a small amount of water is introduced to closed reactor 10 from ammonia storage vessel 18. Once filled, liquid ammonia is withdrawn from reactor 10 from below the surface of the liquid by circulating pump 20 positioned in outlet line 22. The flow of ammonia is directed by means of 3-way diverter valves 24–25 to either by-pass line 26 or to solvator 28 containing a bed of reactive metal 30, such as alkali or alkaline earth metals or mixtures of the same. Suitable representative metals include sodium, potassium, lithium, calcium and magnesium. Aluminum would also a suitable reactive metal. By circulating ammonia 16 through a bed of metal in reactor 28 solvated electrons are formed in-line. This avoids the problems associated with injecting metal rods or other metal sources directly to reaction vessel 10. Accordingly, methods of the present invention contemplate the option of enhanced particle size demarcation and separation of radioactive components in fines of soil and clay with ammonia and electrons solvated in the ammonia.

Whether ammonia circulates through by-pass line 26 or through solvator 28 the solution is recirculated to the bottom of reactor 10 through valve 32, setting up a fluidized flow pattern in the reactor. This produces a mixing action of the soil and ammonia solution and/or solvated electrons to form a slurry. Once the soil has been uniformly dispersed in the ammonia, pump 20 is deactivated to allow the dispersion to undergo phase separation, i.e. a lower solid phase and an upper liquid-solid phase. Large particulates of the dispersion precipitate out as solid phase 34 in the bottom of reactor 10, and are sufficiently free of radionuclide contaminants, the latter being concentrated in a smaller soil fraction consisting of fines or silt dispersed in the ammonia solution as upper liquid-solid phase 36.

The slurry of suspended particle fines forming the upper liquid-solid phase 36 is withdrawn from reactor vessel 10 to evaporator tank 38 via line 40 by opening valve 42. Ammonia 43 is evaporated to separate it from radioactive fines 44. Optionally, the ammonia can be transferred via line 48 to compressor 46 for reliquification if it is desired to recycle the ammonia for further use in the decontamination process. The liquefied ammonia is then transferred to ammonia storage tank 18 through line 50.

EXAMPLE II

PART A

The decontamination of soil with ammoniacal liquid was demonstrated by the following experiment:

A two-kilo batch of common Ohio loam was doped with low levels of cobalt nitrate. The doped soil was analyzed and found to contain 4.5 ppm cobalt. A 10 gram sample of the doped soil was mixed with approximately 80 grams of anhydrous liquid ammonia and shaken until well mixed. The soil was then filtered from the ammonia and sent for analysis. The ammonia was allowed to evaporate from the residue. Analysis of the soil revealed the cobalt content had dropped from 4.5 ppm to 1.1 ppm.

PART B

In order to improve on the removal of $Co^{+2}$ ions from soil which removal is not as efficient as $Co^{+3}$, two methods may be employed:

In the first method, 1.50 equivalents ethylenediaminetetraacetic acid (EDTA) per $Co^{+2}$ ion is mixed with soil and anhydrous liquid ammonia. The soluble Co.EDTA complex is easily filtered from the soil matrix to lower the $Co^{+2}$ concentration in the soil to an acceptable level.

In a second method, ammonium nitrate (10 grams/100 grams of soil) is added to a soil sample and the mixture is agitated with anhydrous liquid ammonia. The solubilized $Co^{+2}$ ions are removed along with the ammonia solvent upon filtration. The toxic impurity and excess ammonium nitrate is isolated by evaporating the solvent and disposed of by methods known in the art.

EXAMPLE III

A 150 gram sample of soil contaminated both with 150 ppm $Sr^{90}$ and 500 ppm polychlorinated biphenyls (PCBs) is placed in reactor 10 (FIG. 2). The reactor is then charged with 1.5 L of liquid ammonia (anhydrous) and pumped through the recirculation loop described in Example I for agitating the soil. After a suitable period, the ammonia is allowed to flow through solvator 28 to generate a solution of solvated electrons by contact and dissolution of 10 grams of calcium metal 30. Solvated electron generation can be a one-time event in which the metal is completely consumed in a continuous flow of ammonia. Alternatively, bypass 26 can be employed at intervals to interrupt the flow of solvated electron solution, and thus cause the introduction of reactant to be a sequence of pulses.

When a sufficient quantity of reactant has been added, the ammonia circulation pump 20 is stopped and the soil slurry allowed to settle briefly to delineate a bottom phase of larger soil particles and a supernatant suspension of ammonia/soil fines/metal particles. This suspension is transferred to tank 38 from whence the ammonia may be separated by vaporization leaving the greatly reduced volume of soil fines/metal material for final disposition in accordance with established local, state and Federal Regulations.

The bulk of the original soil sample charged to the reactor remains therein. The concentration of both radionuclide and PCBs is low enough to permit the treated soil to be returned as landfill as permitted by accepted practices in the remediation field.

EXAMPLE IV

A soil having a higher clay content than that used in Example I, or a soil having a clay fraction with a higher cation exchange capacity than that used in Example I is doped with an arsenic compound. The soil is treated with ammonia as in Example I except no solvated electron solution is introduced. After agitation and separation of the soil fines, the larger particles soil fraction is sufficiently free from the toxic metalloid as to permit its return to a suitable landfill or to the original site of excavation. The clay fines containing the arsenic impurity are of greatly reduced volume and can be stored in less volume of space than otherwise required.

EXAMPLE V

A soil contaminated with hazardous chromium VI ions is mixed with a liquid ammonia in a closed reactor and agitated to thoroughly disperse the soil particles. About 0.5 gallon of liquid ammonia per pound of soil is employed. A solution of solvated electrons is formed from the reaction of the liquid ammonia with calcium metal introduced to the reactor. The addition of the metal may be in a one-time injection or by serial mode of addition. When the blue color typical of solvated electrons persists, the addition of further metal is terminated. After a few minutes to assure complete reaction, the solvated electron solution is quenched. The ammonia is allowed to evaporate and is recovered for further use. The soil has all the chromium ions now with an oxidation number of less than VI, e.g., chromium III ions, is in suitable form for reclamation without further remediation.

EXAMPLE VI

A 500 gram sample of sand contaminated with plutonium compounds is slurried with 1.0 l of anhydrous liquid ammonia in a reaction apparatus such as that illustrated in FIG. 1. Agitation is stopped and the sand quickly settles to reveal a clear ammonia layer due to the lack of any fined-sized particles. The ammonia is decanted and is found to contain very little dissolved plutonium compounds, demonstrating little change has occurred in the level of plutonium compounds in the sand.

For purposes of comparison, 25 gram of montmorillonite clay is added to the reactor and the clay and sand mixture is resuspended in 1.0 l of anhydrous liquid ammonia. Agitation is continued for a time previously shown to permit the clay to adsorb the plutonium ions. Agitation is stopped and the sand quickly settles leaving a clay/ammonia suspension above it. The suspension is removed by decantation.

Since some of the clay/ammonia suspension remains in the reactor, additional ammonia is added and the sequence of agitation, settling and decantation is repeated until the amount of plutonium laden clay is lowered to the desired extent.

The treated sand is removed for appropriate disposal. The clay is freed from the ammonia by vaporizing the liquid. The clay solids are disposed of in a manner prescribed for plutonium contaminated materials. Because of the reduced volume of waste, handling and disposition are more efficient.

EXAMPLE VII 150 grams of soil containing cadmium salts (144 ppm $Cd^{+2}$) is treated with 1.5 liters of anhydrous liquid ammonia in a 3 liter pressure bomb. 8.5 grams of sodium cyanide is added and the mixture stirred for 1 or 2 hours at room temperature. The mixture is filtered. The largest bulk portion of the soil remains on the filter and the small soil fines pass through. Both soil batches are freed from ammonia by evaporation in open vessels. The larger soil particles on the filter (19.5 gram filter cake)is found to have only 38 ppm $Cd^{+2}$ ions. The soil fines passing through the filter contain 116 ppm $Cd^{+2}$ ions. This accounts for 90 percent of the original amount of cadmium in the soil.

This example demonstrates the ability of an ammoniacal liquid and cyanide ion in removing and concentrating hazardous metal ions in small particle fractions of soil.

Thus, the methods of the disclosed invention provide the advantages of separating nuclear waste and/or ions of hazardous nonradioactive metals or metalloids by means of smaller particles than relied on using aqueous based systems; permits recycling of ammonia not otherwise achieved with systems relying on more costly scrubbing chemicals; provides means for readily separating fines from liquid ammonia; eliminates transport and storage of water to desert locations, and provides additional means for controlling particle sizes within a predetermined range with solvated electrons.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

We claim:

1. A method of decontaminating soil containing hazardous metals, which comprises the steps of:
    (a) mixing in a closed vessel an ammoniacal liquid with a soil contaminated with at least one ion of a hazardous metal or metalloid to form a dispersion or slurry;
    (b) separating an ammoniacal liquid-containing product from the dispersion or slurry of step (a) to yield a soil residue sufficiently free of ions of said hazardous metal or metalloid to permit reclamation, and
    (c) separating the ammoniacal liquid from the ammoniacal liquid-containing product of step (b) to yield a hazardous metal or metalloid-containing residue for disposal or further treatment.

2. The method of claim 1 wherein the ammoniacal liquid is anhydrous liquid ammonia or an ammonia-containing solution.

3. The method of claim 2 wherein the ion of said hazardous metal or metalloid is a member selected from the group consisting of radioactive metals, nonradioactive metals and mixtures thereof.

4. The method of claim 2 wherein the ion of said hazardous metal or metalloid is nonradioactive and is a member selected from the group consisting of arsenic, antimony, selenium, cadmium, cobalt, mercury, chromium, lead and mixtures thereof.

5. The method of claim 2 wherein said ammoniacal liquid-containing product of step (b) comprises a coordination compound formed from the ion of a hazardous nonradioactive metal or metalloid and ammonia.

6. The method of claim 5 wherein the coordination compound is a metal-ammonia ligand complex.

7. The method of claim 2 wherein said ammoniacal liquid-containing product of Step (b) comprises a co-ordination compound formed from the ion of a hazardous metal or metalloid and cyanide ion.

8. The method of claim 1 including the step of recycling the ammoniacal liquid of step (c).

9. The method of claim 1 including the addition of a chelating agent to said closed vessel.

10. The method of claim 1 wherein the contaminated soil comprises mainly sand and includes the step of adding a clay to said vessel.

11. A method of decontaminating soil containing hazardous metals, which comprises the steps of:
    (a) mixing in a closed vessel an ammoniacal liquid with a soil contaminated with at least one ion of a hazardous metal or metalloid to form a dispersion or slurry;
    (b) allowing soil particles to selectively precipitate from the dispersion or slurry of step (a) to provide a lower phase comprising a precipitate of soil particulates while forming an upper liquid-solid phase comprising soil fines dispersed in said ammoniacal liquid;
    (c) separating said upper liquid-solid phase from said lower phase, the precipitate of soil particulates of said lower phase being sufficiently free of ions of said hazardous metal or metalloid to permit reclamation of said soil particulates, and
    (d) separating the ammoniacal liquid of said upper liquid-solid phase to yield a residue comprising the hazardous metal or metalloid for disposal or further treatment.

12. The method of claim 11 including the step of recovering and recycling the ammoniacal liquid from step (d).

13. The method of claim 11 wherein the ammoniacal liquid of step (a) is anhydrous liquid ammonia or an ammonia-containing solution.

14. The method of claim 11 wherein the ion of said hazardous metal or metalloid is a member selected from the group consisting of radioactive metals, nonradioactive metals and mixtures thereof.

15. The method of claim 11 wherein the ion of said hazardous metal or metalloid is nonradioactive and is a member selected from the group consisting of arsenic, antimony, selenium, cadmium, cobalt, mercury, chromium, lead and mixtures thereof.

16. The method of claim 14 wherein the soil comprises a member selected from the group consisting of clay, disintegrated rock, sand, organic matter and mixtures thereof.

17. The method of claim 11 including the addition of a chelating agent to said closed vessel.

18. The method of claim 11 including the addition of a ligand complexing agent to said closed vessel.

19. The method of claim 18 wherein the ligand complexing agent is a cyanide ion yielding salt or compound.

20. The method of claim 11 wherein the soil is mainly sand and step (a) includes the addition of a clay to said closed vessel.

21. The method of claim 11 wherein the soil of step (a) comprises a mixed waste.

22. The method of claim 21 wherein said mixed waste comprises an ion of a hazardous nonradioactive metal or metalloid and a nuclear waste.

23. The method of claim 21 wherein said mixed waste comprises an ion of a hazardous nonradioactive metal or metalloid and an ion of a radioactive isotopic metal.

24. The method of claim 22 wherein the nuclear waste comprises at least one radionuclide.

25. The method of claim 24 wherein the radionuclide is a member of the actinide series.

26. The method of claim 23 wherein the radioactive isotopic metal is a member selected from the group consisting of uranium, plutonium, thorium and mixtures thereof.

27. A method of decontaminating soil, which comprises the steps of:
   (a) mixing in a closed vessel an ammoniacal liquid with a soil contaminated with at least one ion of a hazardous metal or metalloid to form a dispersion or slurry;
   (b) treating the dispersion or slurry of step (a) with solvated electrons by contacting with a reactive metal selected from the group consisting of an alkali metal, alkaline earth metal and aluminum;
   (c) separating an ammoniacal liquid-containing product from said dispersion or slurry of step (b) to yield a soil residue sufficiently free of ions of the hazardous metal or metalloid to permit reclamation of the soil, and
   (d) separating said ammoniacal liquid from said ammoniacal liquid-containing product of step (c) to yield a hazardous metal or metalloid-containing residue for disposal or further treatment.

28. The method of claim 27 wherein step (b) is performed by circulating at least a portion of the ammoniacal liquid through a by-pass containing the reactive metal to form solvated electrons, which are recirculated to the closed vessel for treating the contaminated soil.

29. The method of claim 27 wherein the ion of the hazardous metal or metalloid is a member selected from the group consisting of radioactive metals, nonradioactive metals and mixtures thereof.

30. The method of claim 29 wherein the ammoniacal liquid of step (a) is anhydrous liquid ammonia or an ammonia-containing solution.

31. The method of claim 29 wherein the ion of said hazardous metal or metalloid is nonradioactive and is a member selected from the group consisting of arsenic, antimony, selenium, cadmium, cobalt, mercury, chromium, lead and mixtures thereof.

32. The method of claim 30 wherein the soil is contaminated with chromium VI, and is reduced by the solvated electrons.

33. The method of claim 29 wherein the soil comprises a member selected from the group consisting of clay, disintegrated rock, sand, organic matter and mixtures thereof.

34. The method of claim 29 wherein the soil is mainly sand and step (a) includes the addition of a clay to the vessel.

35. The method of claim 27 wherein the soil of step (a) comprises a mixed waste.

36. The method of claim 35 wherein the mixed waste comprises an ion of a hazardous nonradioactive metal or metalloid and a nuclear waste.

37. The method of claim 35 wherein the mixed waste comprises an ion of a hazardous nonradioactive metal or metalloid and an ion of a radioactive isotopic metal.

38. The method of claim 36 wherein the nuclear waste comprises at least one radionuclide.

39. The method of claim 38 wherein the radionuclide is a member of the actinide series.

40. The method of claim 39 wherein the radioactive isotopic metal is a member selected from the group consisting of uranium, plutonium, thorium and mixtures thereof.

41. The method of claim 35 wherein the mixed waste comprises an ion of a hazardous metal or metalloid and an organic compound.

42. The method of claim 41 wherein the organic compound is a halogenated organic compound.

43. The method of claim 42 wherein the halogenated organic compound is a member selected from the group consisting of PCBs, dioxin and pesticides.

\* \* \* \* \*